US009119507B2

(12) United States Patent
Abrams et al.

(10) Patent No.: US 9,119,507 B2
(45) Date of Patent: Sep. 1, 2015

(54) COLLAPSIBLE TRAVEL TUMBLER

(71) Applicant: Urban Tumbler LLC, New York, NY (US)

(72) Inventors: Alex Abrams, New York, NY (US); Benjamin Melinger, New York, NY (US); Jurrien Swarts, Brooklyn, NY (US)

(*) Notice: Subject to any disclaimer, the term of this patent is extended or adjusted under 35 U.S.C. 154(b) by 0 days.

(21) Appl. No.: 14/455,913

(22) Filed: Aug. 10, 2014

(65) Prior Publication Data

US 2015/0041478 A1     Feb. 12, 2015

Related U.S. Application Data

(60) Provisional application No. 61/864,580, filed on Aug. 11, 2013.

(51) Int. Cl.
*B65D 41/02* (2006.01)
*A47J 41/00* (2006.01)

(52) U.S. Cl.
CPC .......... *A47J 41/0055* (2013.01); *A47J 41/0022* (2013.01)

(58) Field of Classification Search
CPC .... B65D 21/086; B65D 1/0292; B65D 41/28; B65D 41/023; A47J 41/0066
USPC .............. 220/8, 666, 592.17, 592.16, 6, 4.28; 215/382
See application file for complete search history.

(56) References Cited

U.S. PATENT DOCUMENTS

| | | | | |
|---|---|---|---|---|
| 879,753 A * | 2/1908 | Eckert | | 220/8 |
| 1,048,935 A * | 12/1912 | Brady | | 220/8 |
| 1,093,873 A * | 4/1914 | Mitchell | | 220/8 |
| 3,285,459 A * | 11/1966 | Gahm | | 220/8 |
| 5,148,936 A * | 9/1992 | DeGrow | | 220/254.3 |
| D347,359 S * | 5/1994 | Robbins, III | | D7/512 |
| 5,384,138 A * | 1/1995 | Robbins et al. | | 426/111 |
| 5,392,941 A * | 2/1995 | Robbins, III | | 220/8 |
| 5,549,213 A * | 8/1996 | Robbins et al. | | 220/8 |
| 5,573,129 A * | 11/1996 | Nagata et al. | | 215/382 |
| 5,632,406 A * | 5/1997 | Robbins, III | | 220/666 |
| 5,862,932 A * | 1/1999 | Walsh et al. | | 220/8 |
| 6,736,285 B2 * | 5/2004 | Stewart-Stand | | 220/666 |
| 6,752,287 B1 * | 6/2004 | Lin | | 220/254.9 |
| D664,003 S * | 7/2012 | Nagoya | | D7/512 |
| 8,833,587 B2 * | 9/2014 | Forsyth et al. | | 220/254.4 |
| 8,887,942 B2 * | 11/2014 | Miksovsky et al. | | 220/521 |
| 2005/0127073 A1 * | 6/2005 | Kusuma et al. | | 220/6 |
| 2006/0201945 A1 * | 9/2006 | Tedford | | 220/254.9 |
| 2012/0205371 A1 * | 8/2012 | Lee | | 220/8 |
| 2012/0217238 A1 * | 8/2012 | Chang | | 220/8 |

* cited by examiner

*Primary Examiner* — Steven A. Reynolds
(74) *Attorney, Agent, or Firm* — John C. Laurence; David D. Rodrigues

(57) ABSTRACT

A collapsible travel tumbler is described. The tumbler includes a collapsible container made of flexible material. The collapsible container is inserted through a rigid collar, on the top edge of which the collapsible cup sits. A lid with a sealable drinking hole is screwed onto the collar, providing a complete and secure closure of the collapsible tumbler. When not in use the collapsible container can be collapsed into the housing created by the combination of the collar and the lid for easy storage and transport.

20 Claims, 8 Drawing Sheets

COLLAPSIBLE TRAVEL TUMBLER

CROSS-REFERENCE TO RELATED APPLICATIONS

This application claims the benefit of U.S. Provisional Application No. 61/864,580, filed on Aug. 11, 2013, in the name of Alex Abrams et al., the disclosure of which is incorporated herein by reference.

FIELD OF THE INVENTION

This disclosure relates generally to reusable drinking containers, and, more specifically, to a travel tumbler that collapses to a small size for storage after use of the tumbler for drinking.

BACKGROUND

Consumers of hot beverages such as coffee and tea have historically been offered one of two options to drink a hot beverage "on the go" as opposed to drinking the hot beverage at home, at the office or in a restaurant. The first option is a disposable cup, which is typically discarded following consumption of the hot beverage and, as such, creates waste. The second option is a reusable travel tumbler which, while reducing the waste produced by the consumer, necessitates that the consumer carry the tumbler following the consumption of the hot beverage. Consumers typically select the use of a reusable travel tumbler based on their concern of the impact of disposable cup waste on the environment, of the greater perceived material integrity of a reusable tumbler as compared to a disposable cup, and of the costs related to continually restocking disposable cups. The inconvenience of carrying the tumbler post-consumption is often times ameliorated by the consumer storing this bulky item in their automobile following consumption. Consumers who do not have use of an automobile on a daily basis, such as urban residents, city commuters, and university students have been less likely to utilize a reusable travel tumbler because of the need to store and transport the reusable tumbler on their person or in a briefcase or small bag they may be carrying following consumption.

Currently there are very limited options available to the consumer who does not utilize an automobile on a daily basis but wishes to use a reusable tumbler for daily drinking of hot beverages. While the consumer may utilize a traditional travel tumbler, this bulky drinking container would need to be carried by the consumer on his person following consumption of the beverage. While there exists on the market some collapsible flexible material-based containers which would allow the consumer to store the drinking vessel in a more compact fashion following consumption of the beverage, such products either exhibit a bulky handle, or otherwise do not provide appropriate insulation to prevent the consumer's hand from experiencing excessive heat radiation from the hot beverage. Many of these products exhibit crevices that are difficult to clean, so that old beverages remain stored in the container after repeated cleaning cycles, and new beverages take on a dissatisfying taste or smell from the old residue. Furthermore, traditional travel tumblers do not ensure that any residual liquid remaining within a flexible material-based container will not leak out once the flexible material-based container is compressed.

BRIEF SUMMARY

The present invention seeks to solve the above-described problems by disclosing a reusable collapsible travel tumbler comprising a collapsible container made of a flexible material which contains a liquid beverage, a rigid collar removably fixed to the upper outermost stage of the flexible material, and a rigid lid removably fixed to the rigid collar. When the collapsible container is in its extended position, the tumbler acts as a receptacle for hot or cold beverages and the rigid collar provides a comfortable surface for the consumer's hand. The user drinks the beverage through a sealable hole in the rigid lid. When the collapsible tumbler is not holding any liquid, the tumbler may be compressed into a low volume shape, allowing the device to be easily stored and transported for future use.

The collapsible tumbler of the present invention provides many advantages including collapsing into a small shape for easy storage and transport following consumption of a beverage, providing a holding collar which insulates the consumer's hand from thermal energy radiating from a beverage, either hot or cold, providing a sealable lid and drinking hole which prevent spillage while the consumer drinks the beverage "on the go," requiring a purposeful compressing motion to switch the tumbler from its expanded configuration to a collapsed configuration and provides for easily disassembling of the collapsible tumbler into its component parts which may then be cleaned in a dishwasher or sink, allowing the user to maintain a hygienic device for everyday beverage consumption. Moreover, the combination of the holding collar and the sealable lid of the present invention ensures that any residual liquids within the collapsible tumbler of the present invention will not leak out when the collapsible tumbler is compressed into a small shape.

The foregoing has outlined rather generally the features and technical advantages of one or more embodiments of the present invention in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

As discussed above, a preferred embodiment of the collapsible tumbler provides a convenient alternative for carrying beverages and minimizing storage space after use. The main container is cup-shaped, formed by stages of a flexible material. When the stages are in their extended position, the container holds hot beverages, such as coffee or tea, or cold beverages, such as cola, for drinking. A removable rigid collar tightly surrounds the largest stage of the flexible container, providing a structure to which a rigid lid can be attached. Together, these rigid pieces seal liquid inside the tumbler and create a comfortable surface for holding the tumbler, buffering thermal energy transfer between the liquid in the container and the consumer's hand. Drinking access to the contents of the tumbler is provided by a small drinking hole in the lid, and an adjacent air vent relieves the potential for a vacuum to form during drinking, allowing liquid to flow evenly out of the tumbler. A flexible stopper attached to the lid is used to plug the lid's drinking hole, so that the beverage will not escape if the tumbler is accidentally tipped. When the tumbler is reasonably emptied, the stages may be collapsed to a small disk shape, allowing the tumbler to be easily stored and transported. As needed, the container, rigid collar, and rigid lid may all be separated for easy cleaning of each part.

Figure 1:
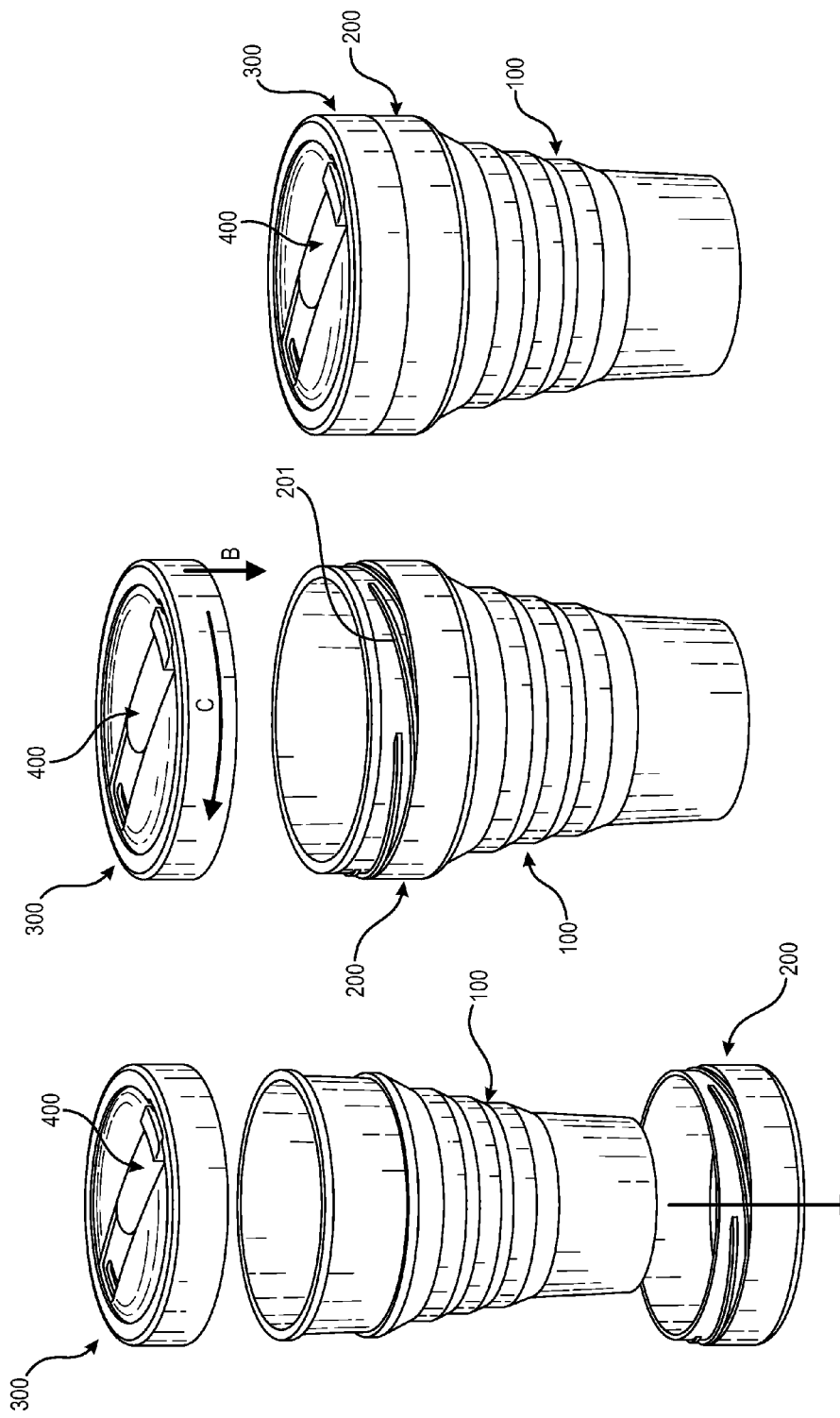
FIGS. 1A-1C show a perspective view of the collapsible tumbler in its expanded position.

In FIGS. 1A-1C, a perspective view of the collapsible tumbler in its expanded position is shown. As shown in FIG. 1A, the collapsible tumbler is comprised of a collapsible container 100, a cylindrical collar 200, a removable lid 300, and a flexible stopper 400. The collapsible container 100 is frustoconical in its extended state. The cylindrical collar 200 is removably attached to the collapsible container 100 by the pulling of the collapsible container 100 through the cylindrical collar 200 in shown direction A.

As shown in FIG. 1B, the collapsible container 100 is pulled through the cylindrical collar 200 until the cylindrical collar 200 reaches a seated position on the upper edge of the collapsible container 100.

Similarly, to remove the cylindrical collar 200 from the collapsible container 100 the collapsible container 100 is pushed through the cylindrical collar 200 in a direction opposite to that of shown direction A. When the cylindrical collar 200 and the collapsible container 100 are in their connected configuration, a hot or cold beverage may be poured into the collapsible container 100.

As shown in FIG. 1B, before drinking the beverage, the user attaches the removable lid 300 to the cylindrical collar 200 via a threaded connection 201 on the cylindrical collar 200. Specifically, after lowering removable the lid 300 in shown direction B and loosely seating the removable lid 300 on the cylindrical collar 200, the consumer rotates the removable lid 300 in shown direction C to secure the removable lid 300 to the cylindrical collar 200.

To unsecure the removable lid 300 from the cylindrical collar 200, the user rotates the removable lid 300 in a direction opposite to that of the shown direction C while lifting the removable lid 300 in a direction opposite to that of shown direction B.

In FIG. 1C, the assembly by the user of the collapsible container 100 to the cylindrical collar 200 which is connected to the removable lid 300 is shown.

Figure 2:
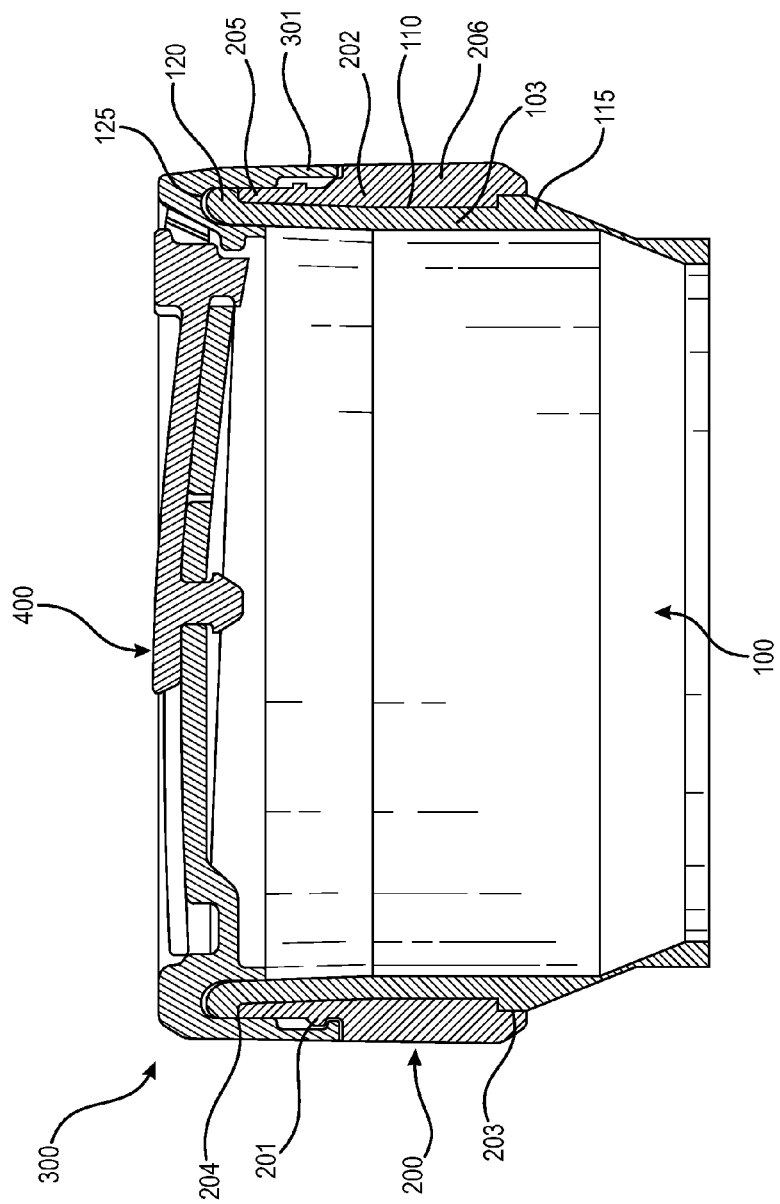
FIG. 2 shows a cross-sectional view of the upper portion of the collapsible tumbler in the expanded position.

In FIG. 2, a cross-sectional view of the upper portion of the collapsible tumbler in the expanded position is shown. As shown in FIG. 2, the collapsible container 100 exhibits a cylindrical thin collar seating wall 110. The cylindrical collar 200 exhibits an inner wall 202 that approximates the diameter and height of the thin collar seating wall 110. A collar retaining ridge 115 on the collapsible container 100 extends outward and downward from the bottom of the thin collar seating wall 110, and exhibits a cross-section shape similar to a trapezoid. The collar retaining ridge 115 revolves around the entire circumference of an upper major stage 105 of the collapsible container.

At the bottom of the cylindrical collar 200 a retaining ridge interface 203 is preferably cut from the bottom inside diameter of the cylindrical collar 200. The cut forming the retaining ridge interface 203 may have a rectangular cross-section and revolve around the entire circumference of the cylindrical collar 200 such that the cylindrical collar 200 may rest securely on top of the collar retaining ridge 115.

A sealing ridge 120 on the collapsible container 100 preferably extends outward from the top of the thin collar seating wall 110, revolving around the entire circumference of the thin collar seating wall 110. The sealing ridge 120 preferably exhibits a curved top 125.

A sealing ridge seat 204 is simply formed by the topmost horizontal flat surface of the cylindrical collar 200. The inner diameter of the sealing ridge seat 204 approximates, but is smaller than, the outer diameter of the sealing ridge 120. As such, the sealing ridge seat 204 provides a resting surface for the sealing ridge 120. When the collapsible container is held in a user's hand only by the cylindrical collar 200, the sealing ridge seat 204 prevents the collapsing container 100 from falling down through the cylindrical collar 200. The cylindrical collar 200 is therefore firmly seated adjacent to the thin collar seating wall 110, bounded by the collar retaining ridge 115, at its bottom, and the sealing ridge 120, at its top.

The cylindrical collar 200 is comprised of a top cylinder 205 and a bottom cylinder 206, which are similar in height in this embodiment. The top cylinder 205 is approximately half the thickness of the bottom cylinder 206. The cylindrical collar 200 is created using injection molded plastic and the bottom cylinder 205 is at least 3.175 mm or 0.125 inches in thickness. When a hot or cold beverage is poured into the collapsible container 100, this minimum dimension of the bottom cylinder 205 ensures that the consumer's hand will be reasonably buffered from the temperature of the beverage inside the collapsible container 100, so that the user feels little to no thermal transfer from the beverage.

On the outer diameter of the top cylinder 205, there are a series of evenly spaced threads 201 that extend around the circumference of the cylindrical collar 200, in low relief. Each of the evenly spaced threads 201 revolve through an approximate one-quarter turn around the circumference of the cylindrical collar 200. The evenly spaced threads 201 revolve in a clockwise downward spiral, starting in the middle of the outer diameter of the top cylinder 205 through to the interface between the top cylinder 205 and the bottom cylinder 206.

Figure 3:
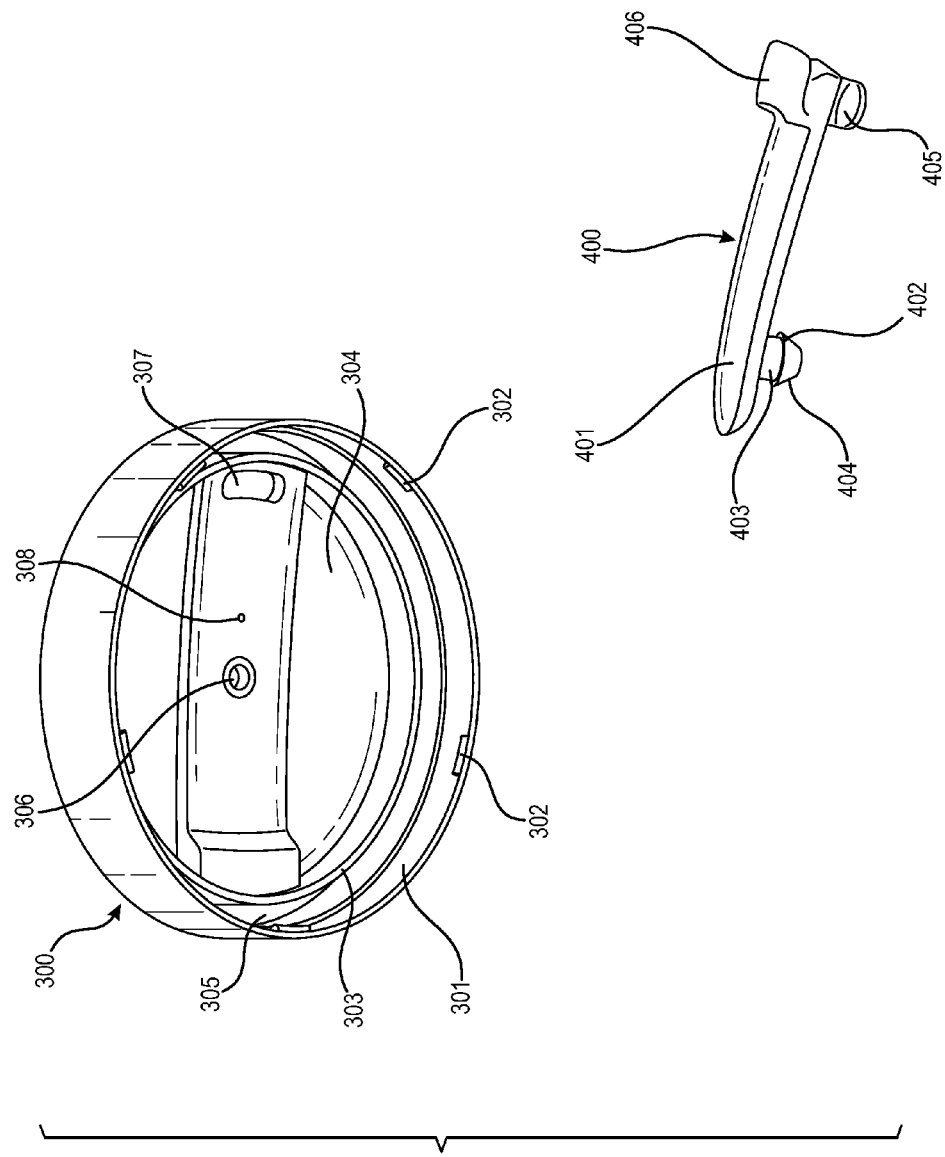
FIG. 3 shows a perceptive view of the removable lid.

In FIG. 3, a perspective view of the removable lid is shown. As shown in FIG. 3, the removable lid 300 exhibits a thin-walled cylinder 301 revolving around the entire circumference of the removable lid 300.

The removable lid 300 includes a series of five evenly spaced lugs 302 extend inward from the bottom of a thin-walled cylinder 301 and act as counterparts to the evenly spaced threads 201 of the cylindrical collar 200. The lugs 302 may have square cross-sections and each revolve through a short angle around the inside of the thin-walled cylinder 301. As such, the removable lid 300 secures to the cylindrical collar 200 via a traditional lug canning jar interface.

The removable lid 300 comprises a circular solid disk 304 which acts as a barrier at the upper end of the collapsible tumbler. An inner thin-walled cylinder 303 is concentric to, and shorter than, the thin-walled cylinder 301, extending downward from the circular solid disk 304. An arched channel 305 is carved into the bottom surface of the circular solid disk 304 and is bounded by the thin-walled cylinders 301. The cross-section of the arched channel 305 has a slightly smaller radius than the cross-section of the curved top 125 of the collapsible container 100.

Referring again to FIG. 2, when the removable lid 300 is securely fit to the cylindrical collar 200, the sealing ridge 120 on the collapsible container 100 is forced into compression between the sealing ridge seat 204 of the cylindrical collar 200 and the arched channel 305 of the removable lid 300. This interaction creates a seal that prevents a beverage from inadvertently escaping the collapsible tumbler at the interface between the collapsible container 100 and the removable lid 300.

Referring back to FIG. 3, a securing knob hole 306 on the removable lid 300 is preferably circular in shape and cuts through the focal point of the removable lid 300.

As also shown in FIG. 3, a flexible stopper 400 has a mostly flat rectangular shape with one semi-circular end 401. A securing knob 402 is located at the focal point of the semi-circular end 401 of the flexible stopper 400. The securing knob 402 extends from the bottom of the flexible stopper 400. The securing knob 402 is mushroom shaped with a mushroom neck 403 and a mushroom head 404. The securing knob 402 secures the flexible stopper 400 to the removable lid 300 via the securing knob hole 306 on the removable lid 300. The flexible stopper exhibits 360-degrees of rotation relative to the removable lid 300 based on the connection between the securing knob 402 and the securing knob hole 306.

During assembly, the mushroom head 404 is forced through the securing knob hole 306 of the removable lid 300. The mushroom head 404 has a larger diameter than the securing knob hole 306 and rests below and adjacent to the securing knob hole 306. The mushroom head 404 prevents the flexible stopper 400 from easily disconnecting from the removable lid 300. The mushroom neck 403 has a diameter that is negligibly larger than the diameter of the securing knob hole 306. The mushroom neck 403 is in constant contact with the securing knob hole 306. The overfit between the mushroom neck 403 and the securing knob hole 306 creates a seal that prevents liquid from escaping through the securing knob hole 306 on the removable lid 300.

A mostly elliptical drinking hole 307 on the removable lid 300 preferably cuts through the removable lid 300 adjacent to, and within the circumference of, the shorter thin-walled cylinder 303 of the removable lid 300.

A drinking hole plug 405 preferably extends from the bottom of the flexible stopper 400. The drinking hole plug 405 is preferably a similar elliptical shape to the drinking hole 307 with a larger girth.

Figure 4:
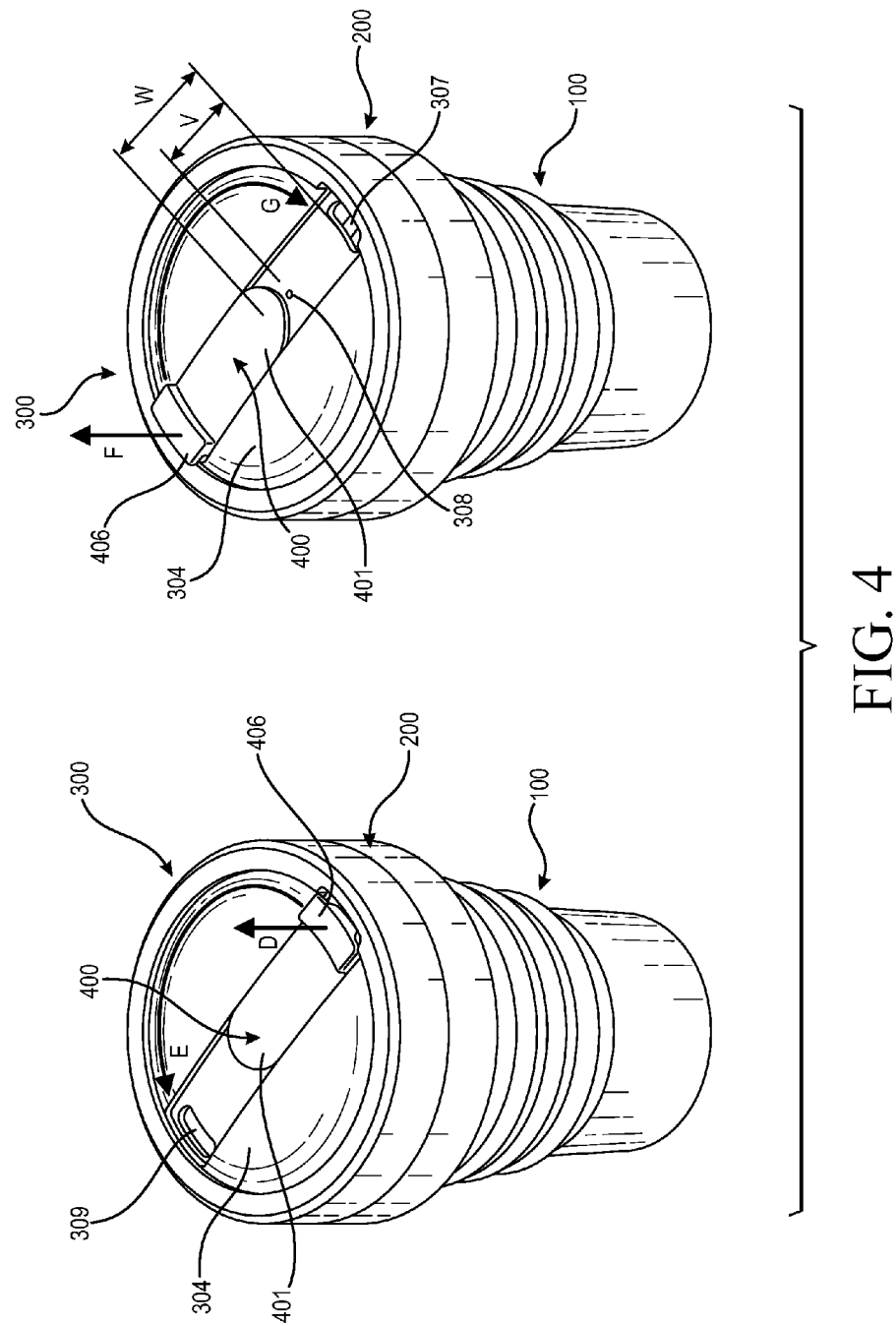
FIG. 4 shows a perspective view of the flexible stopper in the open position and in the closed position.

In FIG. 4, a perspective view of the flexible stopper in the open position and in the closed position is shown. As shown in FIG. 4, when the user is transporting liquid inside the expanded collapsible container 100, the drinking hole plug 405 (not shown) fits snuggly inside the drinking hole 307. The larger girth of the drinking hole plug 405 (not shown), as compared to the drinking hole 307, creates a seal preventing liquid from escaping through the drinking hole 307. A pull tab 406 extends from the top surface of the flexible stopper 400, and is vertically aligned with the drinking hole plug 307.

A plug recess 309 on the removable lid 300 mirrors the drinking hole 307 in size and shape, and is located 180-degrees away from the drinking hole 307 on the circular solid disk 304 of the removable lid 300. The shape of the plug recess 309 cuts downward from the top surface of the circular solid disk 304. However, unlike the drinking hole 307 on the removable lid 300, the shape of the plug recess 309 does not penetrate through the entire surface of the circular solid disk 304. As such, when the user wishes to drink a liquid from the collapsible tumbler, they pull up on the pull tab 406 on the flexible stopper 400 in shown direction D, which releases the drinking hole plug 405 (not shown) from the drinking hole 307. The user then rotates the stopper 400 180-degrees in shown direction E. The user then pushes downward on the pull tab 406 opposite to the shown direction D, forcing the drinking hole plug 405 (not shown) into a seated position within the plug recess 309.

The removable lid 300 also includes a small circular vacuum release hole 308 placed between the drinking hole 307 on the removable lid 300 and the semi-circular end 401 of the flexible stopper 400. The shape of the vacuum release hole 308 may be circular and penetrate through the circular solid disk 304 of the removable lid 300. The small circular vacuum release hole 308 is a shown positioned distance V from the drinking hole 307 that approximates three fifths of the shown distance W between the drinking hole 307 and the securing knob hole 306 (not shown) on the removable lid 300.

When the collapsible tumbler is tipped to pour liquid into the consumer's mouth, liquid exits through the drinking hole 307 on the removable lid 300. The vacuum release hole 308 on the removable lid 300 allows air to flow back into the collapsible tumbler, replacing the volume of liquid exiting through the drinking hole 307. The vacuum release hole 308 thus ensures a steady flow of liquid out of the drinking hole 307. The shown distance V must be at least three fifths of the shown distance W, so that when the cup is tipped for drinking from the drinking hole 307, the liquid level does not block the vacuum release hole 308, preventing air from flowing into the collapsible tumbler.

When the user wishes to stop drinking from the collapsible tumbler and transport the liquid in a secure fashion, the user pulls up on the pull tab 406 on the flexible stopper 400 in shown direction F, which releases the drinking hole plug 405 (not shown) from the plug recess 309 on the removable lid 300. The user then rotates the flexible stopper 400 180-degrees in shown direction G. The user then pushes downward on the pull tab 406 in a direction opposite shown direction F, forcing the drinking hole plug 405 (not shown) into a position within the drinking hole 307, forming a seal that prevents liquid from escaping through the drinking hole 307.

When the user has finished drinking and wants to prepare the collapsible tumbler for the collapsing motion, they release the drinking hole plug 405 (not shown) from the drinking hole 307 and places the drinking hole plug 405 (not shown) into the plug recess 309. With the drinking hole 307 now unblocked, air may quickly flow out of the collapsible tumbler during the collapsing motion. The user preferably pours out the remaining liquid so that only a small amount of moisture remains inside the collapsible tumbler during the collapsing motion.

Figure 5:
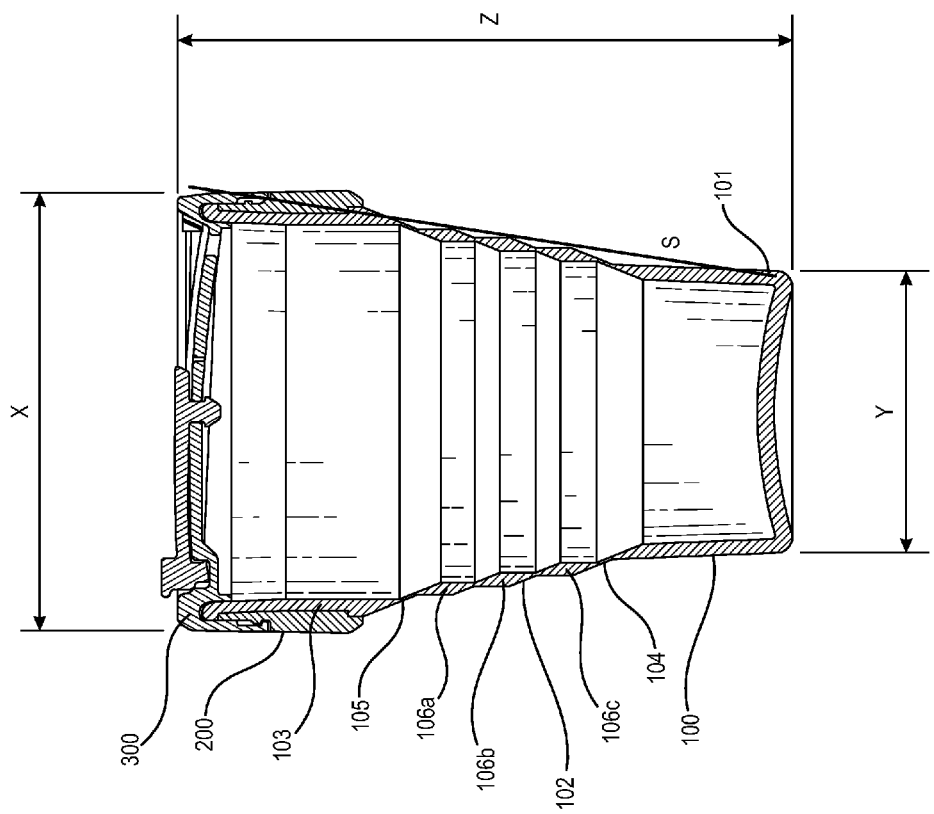
FIG. 5 shows a cross-sectional view of the collapsible tumbler in the expanded position with emphasis on the structure of the collapsible container.

In FIG. 5, a cross-sectional view of the collapsible tumbler in the expanded position with emphasis on the structure of the collapsible container is shown. As shown in FIG. 5, the collapsible container 100 includes a staged compressive wall and is primarily cup-shaped. The staged compressive wall preferably consists of a lower major stage 101, which is generally smaller in diameter than a middle major stage 102, which in turn is generally smaller in diameter than an upper major stage 103.

In this embodiment, the container 100 holds approximately 0.35 liters of liquid, and the collapsible tumbler's dimensions approximate those of a traditional 12 ounce coffee cup. This requires that the shown height Z of the collapsible container is approximately 12.32 cm and the shown outer diameter X of the cylindrical collar 200 and the removable lid 300 are approximately 8.89 cm (with a radius of approximately 4.45 cm), approximating the grip size of an adult male's hand.

The lower major stage 101 has a shown diameter Y of approximately 5.33 cm (with a radius of 2.67 cm). Considering the shown height Z of the collapsible tumbler, as well as the shown diameter X of the cylindrical collar 200 and the removable lid 300, this shown diameter Y of the lower major stage 101 allows the collapsible tumbler to remain stable, and unlikely to topple, when standing on a flat surface.

The shown slope S of the collapsible tumbler is approximately 6.93 when defined as the height Z of 12.32 cm divided by the difference between the radii of 1.78 cm. With this steep slope, particular features of the collapsible cup 100, are required in order to enable a repeatable collapsing motion.

A lower articulating wall 104 may be significantly shorter and thinner than the lower major stage 101, and flare outward and upward from the top of the lower major stage 101, connecting the lower major stage 101 to the bottom of the middle major stage 102. An upper articulating wall 105 may approximate the height and thickness of the lower articulating wall 104 and flare outward and upward from the top of the middle major stage 102, connecting the middle major stage 102 to the bottom of the upper major stage 103. The middle major stage 102 itself may consist of a series of minor stages 106A, 106B and 106C.

Each minor stage 106 A-C can be relatively the same size. The highest portion of the minor stage 106 begins with a width that is similar to the width of the upper and lower articulating walls 104 and 105. Viewing the minor stage 106 from the latitudinal axis, the width of the minor stage 106 increases from the top most point of the minor stage 106 to the middle of the minor stage 106. Continuing on the latitudinal axis, the width of the minor stage 106 begins to decrease from the middle of the minor stage to the lowest portion of the minor stage 106, where such width is comparable and similar to the width of the upper and lower articulating walls 104 and 105.

Figure 9:
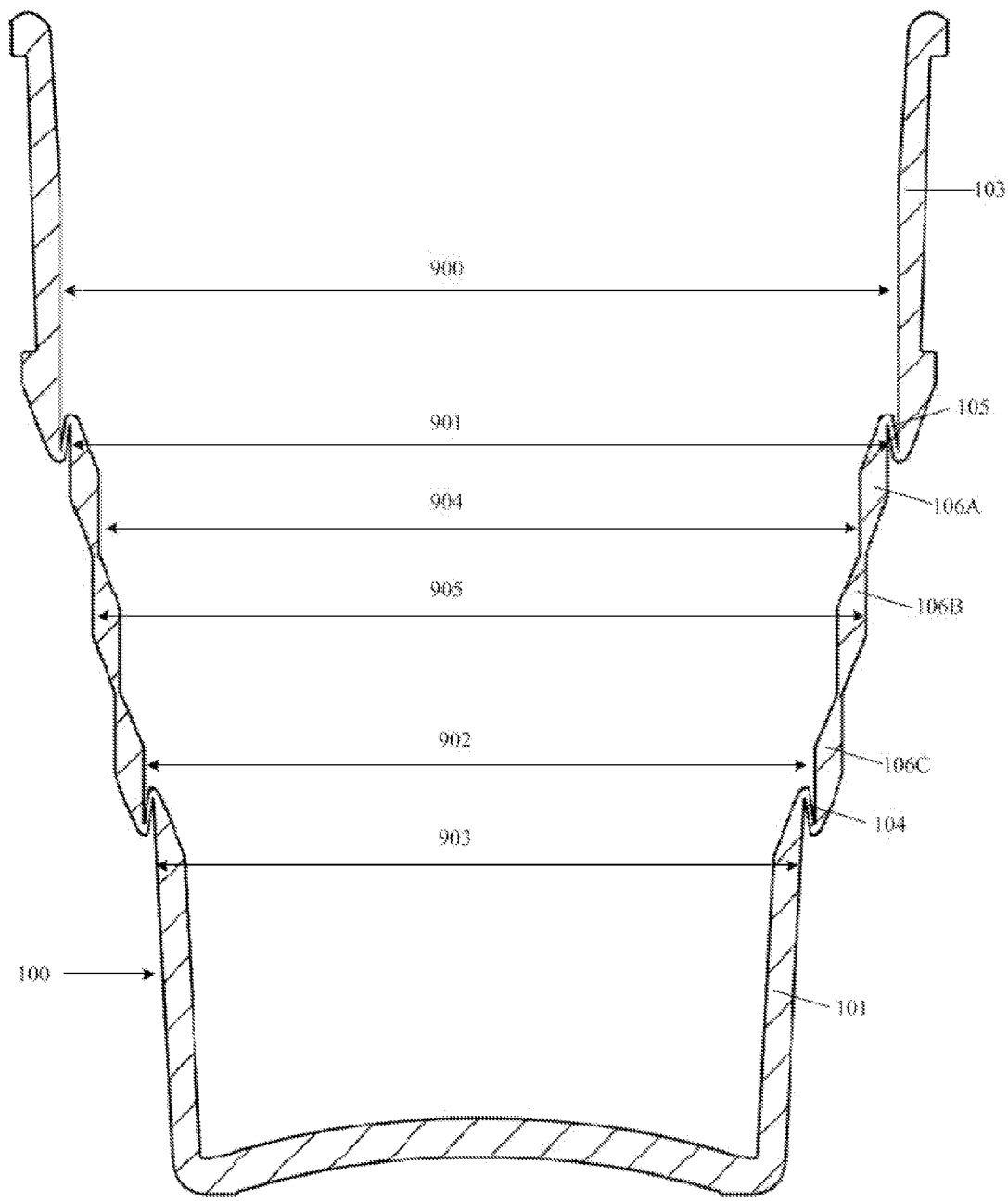
FIG. 9 shows a cross sectional view of the collapsible cup as it begins a transition from an expanded position to a collapsed position.

In FIG. 9, a cross sectional view of the collapsible cup as it begins a transition from an expanded position to a collapsed position. As shown in FIG. 9, the inner diameter 902 of the minor stage 106C immediately above the lower major stage 101 may be greater than the outer diameter 903 of the lower major stage 101. The inner diameter 902 is the diameter of the minor stage 106C immediately above the lower major stage 101, excluding the width or girth of the minor stage 106C at any point. The outer diameter 903 of the lower major stage 101 is the diameter of the lower major stage 101 including the width or girth of the lower major stage 101 at any point.

The outer diameter 901 of the minor stage 106A immediately below the upper major stage 103 may be less than the inner diameter 900 of the upper major stage 103. The inner diameter 900 is the diameter of the upper major stage 103, excluding the width or girth of the upper major stage 103 at any point. The outer diameter 901 of the minor stage 106A immediately below the upper major stage 103 is the diameter of said minor stage 106A, including the width or girth of the minor stage 106A at any point.

The orientation of having the inner diameter 902 of the minor stage 106C immediately above the lower major stage 101 being greater than the outer diameter 903 of the lower major stage 101, while having the outer diameter 901 of the minor stage 106A immediately below the upper major stage 103 being less than the inner diameter 900 of the upper major stage 103, permits the container 100, and specifically the lower major stage 101, to envelope itself within the upper major stage 103 while being encircled by the minor stage 106 when the container 100 is fully collapsed.

Concentrating on the minor stage 106A immediately below the upper major stage 103, at the lowest point of the minor stage 106A, the inner diameter 904 of the minor stage 106A is equal to the outer diameter 905 of minor stage 106B at its lowest point. The inner diameter 904 is the diameter of the minor stage 106A excluding the width or girth of the minor stage 106A 103 at any point. The outer diameter 905 of the minor stage 106B is the diameter of said minor stage 106B, including the width or girth of the minor stage 106B at any point. The same pattern is true regarding the inner diameter of minor stage 106B and the outer diameter of minor stage 106C. During the collapsing of the container 100, the orientation of having the inner diameter 904 to be equal to the outer diameter 905 within the minor stages 106 A-C, causes the minor stages 106 A-C to act as a single wall of resistance. This act of resistance by the minor stages 106 A-C allows the force exerted by a user on the container 100 to first reorient the thinner upper articulated wall 105 and the lower articulated wall 104. As a result of the inner diameters 900 and 902 being wider than the outer diameters 901 and 903, respectively, and because of the general thin nature of the upper and lower articulated walls 104 and 105, the upper and lower articulated walls 104 and 105 exert less resistance against the collapsing motion than do the minor stages 106 A-C.

Referring back to FIG. 5, while the collapsible container 100 is in its expanded position, the angle of the lower articulating wall 104 and the angle of the upper articulating wall 105 on the outer circumference of the collapsible container 100 may be a right angle or an obtuse angle. The angle of the minor stages 106A-C on the outer circumference may also be a right angle or an obtuse angle.

In this particular embodiment, the diameter of the container 100 progressively shortens from the top of the container 100 to the bottom of the container. As such, the diameter of the upper major stage 103 is greater than the diameter of the middle major stage 102, and the diameter of the middle major stage 102 is greater than the diameter of the lower major stage 101. In holding with the principal that the diameter of the collapsible container 100 progressively shortens from the top of the collapsible container 100 to the bottom, the upper articulating wall 105 diameter is greater than the diameter of the of the lower articulating wall 104. The progressively smaller diameter of the container 100 allows for the middle major stage 102 and the lower major stage 101 to collapse into and be enveloped within upper major stage 103.

The height of the upper major stage 103, middle major stage 102, and the lower major stage 101 are approximately the same, but each stage gets progressively shorter from the top of the container 100 to the bottom of the container. The height of the upper major stage 103, the middle major stage 102, and the lower major stage 101 get progressively smaller to enable the collapsing of the container 100 in a manner such that the middle major stage 102 does not extend above the upper most portion of the upper major stage 103, while permitting the lower major stage 101 to enclose itself completely within the upper major stage 103 without the lower major stage extending from the lowest bound of the upper major stage 103. In this particular embodiment, the upper major stage 103 is 39.25 mm tall, the middle major stage 102 is 36.34 mm tall, and the lower major stage 101 is 35.18 mm tall.

The height of the upper articulating wall 105 and the lower articulating wall 104 can be ascertained by the correlation ratio between the average major stage height and the height of the upper articulating wall 105 and the lower articulating wall 104. The average major stage height is calculated by adding the heights of the lower major stage 101, middle major stage 102, and upper major stage 103 and dividing the total height by the number of major stages used to create the total. The ratio range of the height of the upper articulating wall 105 and the lower articulating wall 104 to enable proper collapsing of the collapsible container 100 is 1:5 to 1:20 of that height to the average major stage height. In this particular embodiment, the height of the lower major stage 101, middle major stage 102, and upper major stage 103 is 35.18 mm, 36.34 mm, and 39.26 mm respectively. Using the calculation described above, the average major stage height is 36.93 mm. As such, in this particular embodiment, the height of upper articulating wall 105 and the lower articulating wall 104 would need to be a minimum of 1.85 mm to a maximum height of 7.39 mm to enable proper collapsing of the collapsible container 100.

The height of the thin collar seating wall 110 on the collapsible container 100, which is enveloped by the cylindrical collar 200 to enable the proper collapsing of the container 100, is ascertained by correlation of a ratio between the height of the collapsible container 100 and the height of the thin collar seating wall 110. The ratio range of the height of the thin collar seating wall 110 to enable proper collapsing off the collapsible container 100 is a minimum of 1:10 of the height of the collapsible container 100. A sufficiently tall thin collar seating wall 110, and by association the cylindrical collar 200 which sits within the thin collar seating wall 110, facilitates the collapsing of the collapsible container 100 by maintaining the collapsible container 100 upper portion static while the rest of the container 100 deforms in a predictable and desirable manner. In this particular embodiment, the container 100 has a height of 119.18 mm. Utilizing the ratio provided above, the thin collar seating wall 110 must have an approximate minimum height of 11.92 mm to properly enable the collapsible container 100 to collapse in a predictable and desired manner.

Figure 6A:
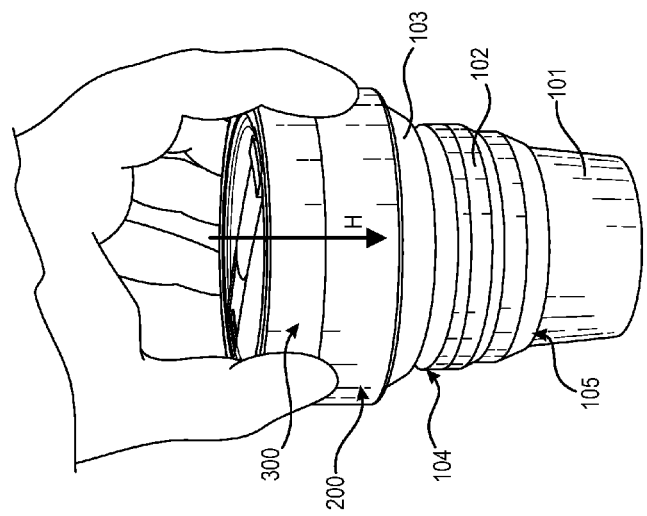
FIGS. 6A and 6B show a cross-sectional view of the collapsible tumbler transitioning from an expanded position to a collapsed position.
Figure 6B:
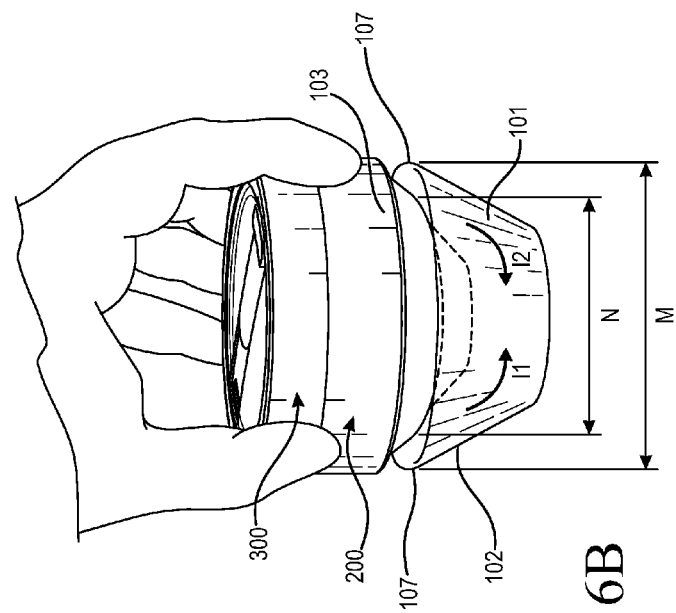

In FIGS. 6A and 6B, a cross-sectional view of the collapsible tumbler transitioning from an expanded position to a collapsed position is shown. As shown in FIG. 6A, in order to collapse the collapsible container 100, the consumer places his palm face-down on the closed surface 304 (not shown) of the removable lid 300 and wraps his thumb and other fingers around both the thin-walled cylinder 301 (not shown) of the removable lid 300 as well as the bottom cylinder 206 (not shown) of the cylindrical collar 200. The user "winds up" by lifting the collapsible tumbler opposite the shown direction H. The user then quickly thrusts the collapsible tumbler in shown direction H toward the flat surface.

As the cylindrical collar 200 and removable lid 300 move downward, the motion of a closed surface 109 (not shown) on the bottom of the collapsible container 100 is thwarted by a flat surface. The collapsible container 100 compresses along shown direction H. The first features that reorient in order to allow the compression are the articulating walls 104 and 105, which buckle, changing from a flat or obtuse orientation to a bent acute orientation. As such, the angle of the outer circumference of the articulating walls 104 and 105, when buckling, goes from an obtuse angle to an acute angle during the first phase of the collapsing container 100. This buckling orients the top portion of the lower major stage 101 in a position concentric to, and inside of, the bottom portion of the middle major stage 102. Similarly, the top portion of the middle major stage 102, orients in a position concentric to, and inside of, the bottom portion of the upper major stage 103.

As shown in FIG. 6B, as the user continues to quickly force the cylindrical collar 200 and removable lid 300 in shown direction H, the compressive wall of the collapsible container 100 begins to deform in a predictable manner. The middle major stage 102 begins to fold into the upper major stage 103, so that the minor stages 106A-C may reorient to be inside of the upper major stage 103. In this process, the angle of the outer circumference of the minor stages 106A-C go from an obtuse angle to an acute angle. As the middle major stage 102, and by proxy the minor stages 106 A-C, fold into the upper major stage 103 the angle of the outer circumference of the minor stages 106A-C reorients itself as an obtuse angle. Meanwhile, the lower major stage 101 loses its cylindrical shape. The lower major stage 101 begins to exhibit flat walls on its top end, similar to the flattened portion of a tube of toothpaste. This flattened portion of the lower major stage 101 terminates at some points 107. The shown distance M between points 107 is greater than the shown diameter N of the bottom of the upper major stage 103. As the user continues to thrust the cylindrical collar 200 and removable lid 300 downward, the points 107 push against the more structurally rigid bottom portion of the major stage 103 and the points 107 deform in shown directions I1 and I2. The points 107 now pass through the bottom portion of the major stage 103. Middle major stage 102 and lower major stage 101 are enveloped within upper major stage 103.

The minor stages 106 need not collapse in succession. In this particular embodiment, the collapsing on minor stage 106B prior to the collapse of the other minor stages 106 A and 106 C does not prevent the successful collapse of the lapsable container 100, so long as the user continues to exert a quick downward force in direction H to successfully transition the minor stages 106 A-C from an obtuse angle to an acute angle. In the event the user, in the middle of collapse of the container 100, stops exerting sufficient downward force in direction H and the minor stages 106 have not fully be reoriented, the minor stages 106 will simply reengage causing the container 100 to revert back to the fully extended position.

Figure 7:
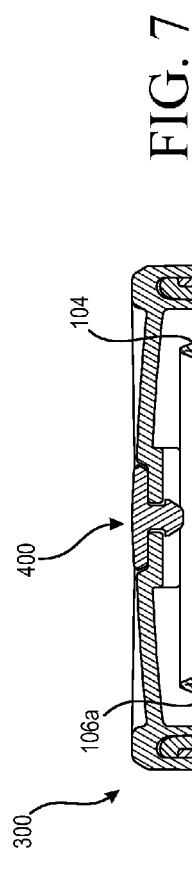
FIG. 7 shows a cross-sectional view of the collapsible tumbler in the collapsed position.

In FIG. 7, a cross-sectional view of the collapsible tumbler in the collapsed position is shown. As shown in FIG. 7, when the collapsible tumbler is in the collapsed position, the middle major stage 102 and the lower major stage 101 take on non-deformed, radially symmetric forms that are concentric to, and inside of, the upper major stage 103. When in the collapsed position, the lower articulated stage member 104 retains the acute angle on the outer circumference of the collapsible container 100 while the upper articulated stage member 105 has reoriented itself from an acute angle to an obtuse angle. The middle major stage 102 outer circumference angle and minor stages have reoriented themselves into an obtuse angle.

When collapsed, the outer wall of the lower major stage 101 becomes adjacent to the outer wall of the middle major stage 102 along with the out walls of the minor stages 106 A-C. Further, the inner wall of the middle major stage 102, along with the inner walls of the minor stages 106 A-C will be adjacent to the inner wall of the upper major stage 103. The middle major stage 102, and the minor stages 106, when fully collapsed, will retain the original slope prior to collapse, but the slope of the middle major stage 102 will be inverted over an x-axis.

Figure 8:
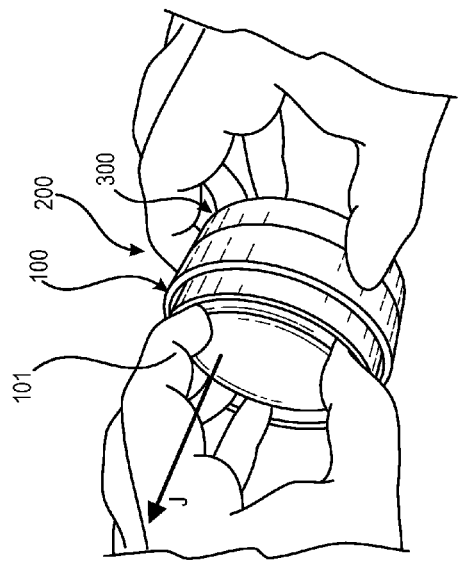
FIG. 8 shows a perspective view of the collapsible tumbler transitioning from the collapsed position to the expanded position.

In FIG. 8, a perspective view of the collapsible tumbler transitioning from the collapsed position to the expanded position is shown. To prepare to expand the collapsible tumbler, perhaps for use with another liquid, the user releases the drinking hole plug 405 (not shown) on the flexible stopper 400 (not shown) from the drinking hole 307 (not shown) on the removable lid 300 (not shown) and places the drinking hole plug 405 (not shown) into the plug recess 309 (not shown) on the removable lid 300 (not shown). With the drinking hole 307 (not shown) now unblocked, air may quickly flow into the collapsible tumbler during the expanding motion.

As shown in FIG. 8, in order to expand the collapsible tumbler, the user places his palm face-down on the closed surface 304 (not shown) of the removable lid 300 and wraps his thumb and other fingers around both the thin-walled cylinder 301 (not shown) of the removable lid 300 as well as the bottom cylinder 206 of the cylindrical collar 200. With his other hand, he surrounds the lower major stage 101 of the collapsible container 100 with the tips of their fingers and thumb, gripping the lower major stage 101. The user expands the collapsible container 100 by separating his two hands until the upper major stage 103, middle major stage 102, and lower major stage 101 of the collapsible container 100 regain their original expanded orientations.

To allow for compression and expansion, the collapsible container 100 may be made of a variety of materials. In one preferred embodiment, the collapsible container 100 is made from a silicone rubber material. This material is chemically inert and will not leach contaminants into stored beverages. It is also flexible, moderately resistant to tears, and provides some protection against heat transfer from hot liquids to the user's hand. Alternative embodiments may use other flexible materials, such as rubber or synthetic elastomers. Similar varieties of materials may also be used to form the flexible stopper 400. Any suitable material may be used to form the collar 200 and lid 300 including, but not limited to, plastic, ceramic, stainless steel, glass, or wood.

The collapsible container 100, cylindrical collar 200, removable lid 300, and flexible stopper 400 may be manufactured in a conventional manner such as, but not limited to, injection and compression molding techniques.

Alternative embodiments of the compressible tumbler may also include one or more of the following. Different materials, sizes, and interconnections may be used for all components. In any alternative embodiment, the stopper 400 can be replaced by any type of apparatus that is used to plug or seal a drinking outlet. The pull tab 406 on the flexible stopper 400 can be omitted or it can be altered into any shape that allows the user to easily grasp and rotate the flexible stopper 400. The connection between the flexible stopper 400 and removable lid 300 can be replaced by any clip, snap, fastener, or other connection to ensure the flexible stopper 400 and the removable lid 300 are securely attached. The plug recess 309 can be omitted or placed in a different location on removable lid 300. The circular vent hole 308 can be omitted or it can be placed in a different location on removable lid 300. The securing knob hole 306 can be placed in a different location on the removable lid 300. The removable lid 300 and the cylindrical collar 300 can be transformed into any shape. For example, these parts could be box-shaped versus cylindrical. The thread and lug connection between the removable lid 300 and cylindrical collar 200 can be replaced by any thread, clip, snap, fastener, or other connection to ensure that the removable lid 300 and the cylindrical collar 200 are securely attached. When the removable lid 300 is attached to the cylindrical collar 200, the arched channel 305, inner thin-walled cylinder 303, and sealing ridge 204 can all be reconfigured into any sort of orientation to ensure the collapsible tumbler is sealed. These parts can altogether be replaced by another sort of sealing apparatus that limits liquid from leaking out of the collapsible tumbler. The retaining ridge 115 may be omitted or it may be reshaped in any way to allow it to interact with the cylindrical collar 200. The thicknesses of the top cylinder 205 and the bottom cylinder 206 of the cylindrical collar 200 may be altered. The cylindrical collar 200 can also be permanently attached to the collapsible container 100. In place of the lower major stage 101, middle major stage 102, upper major stage 103, and minor stages 106a-106c, the collapsible container 100 can be comprised of any number and shape of connected stages or it can be replaced by a collapsible container of any different shape. The sealing ridge 120 and collar retaining ridge 115 can be omitted or their orientation about the collapsible container 100 can be adjusted.

Having described and illustrated the principles of this application by reference to one or more preferred embodiments, it should be apparent that the preferred embodiment(s) may be modified in arraignments and detail without departing from the principles disclosed herein and that it is intended that the application be construed as including all such modifications and variations insofar as they come within the spirit and scope of the subject matter disclosed herein.

What is claimed is:

1. A collapsible container comprising of:
   a frustoconical member with an upper articulated stage member, a lower articulated stage member, at least one minor stage, a lower stage, and an upper stage;
   a sealing ridge connected to a first end of the upper stage;
   a collar removably and slidably connected to the frustoconical member that is capable of insulating thermal energy; and
   a lid slidably connected to the collar that is capable of insulating thermal energy; wherein
   the upper articulated stage member, the lower articulated stage member, the at least one minor stage, the lower stage, and the upper stage all share a substantially concentric relation;
   the upper stage is relatively closer to the sealing ridge than the minor stage and the minor stage is relatively closer to the sealing ridge than the lower stage;
   the upper stage, the at least one minor stage, and the lower stage each have a thickness greater than that of the upper articulated stage member and the lower articulated stage member;
   the at least one minor stage is connected to the lower stage by the lower articulating stage member and is connected to a second end opposite the first end of the upper stage by the upper articulated stage member wherein
   when an adequately strong downward force is exerted on the top of the frustoconical member and an equal and opposite force is exerted on the bottom of the frustoconical member, the upper articulated stage member transitions to a position such that the upper articulated stage member is positioned in-between and in direct contact with an outer inner surface of the at least one minor stage and an inner surface of the upper stage and
   the lower articulated stage member transitions to a position such that the lower articulated stage member is positioned in-between and in direct contact with the outer surface of the at least one minor stage and an outer surface of the lower stage; and
   wherein the second end of the upper stage includes a collar retaining ridge positioned such that the collar may be sandwiched between the sealing ridge on the first end of the upper stage and the collar retaining ridge on the second end of the upper stage.

2. The collapsible container of claim 1, wherein the diameter of the frustoconical member becomes progressively smaller from the top of the frustoconical member to the bottom of the frustoconical member.

3. The collapsible container of claim 1, wherein while force is still being exerted, a modified position of the upper and lower articulated stage members forces the minor stage to pivot upwards and inwards towards the center of the upper stage and thereby thrusts the lower stage upward and embeds itself within the upper stage.

4. The collapsible container of claim 1, wherein the slope of the frustoconical member is a minimum of 6.5.

5. The collapsible container of claim 1, wherein the frustoconical member is made from silicone rubber.

6. The collapsible container of claim 1, wherein the diameter of the at least one minor stage is greater than the lower stage diameter and less than the upper stage diameter.

7. The collapsible container of claim 1, wherein the upper articulating wall and the lower articulating wall each flare outward and upward from the lower stage toward the upper stage.

8. The collapsible container of claim 1, wherein the minor stage is comprised of a diamond shape and has a thickness greater than the upper articulating wall and the lower articulating wall.

9. The collapsible container of claim 1, wherein the lower stage diameter is less than the diameter of the upper stage.

10. The collapsible container of claim 1, wherein the collar is substantially cylindrically shaped.

11. The collapsible container of claim 1, wherein the lid is substantially cylindrically shaped.

12. The collapsible container of claim 1, wherein the collar is comprised of a bottom wall, an inner wall, a retaining ridge interface, a sealing ridge, and evenly spaced threads in low relief.

13. The collapsible container of claim 1, wherein the lid is comprised of a vent hole, a drinking hole, plug recess, an inner thin wall, an outer wall, an arched channel, a securing knob hole, and a flexible stopper.

14. The collapsible container of claim 13, wherein the sealing ridge is fastened between the inner thin wall and outer wall of the lid and plugs the arched channel.

15. The collapsible container of claim 13, wherein the flexible stopper exhibits 360 degrees of rotation.

16. The collapsible container of claim 13, wherein the flexible stopper comprises of a securing knob, a pull tab, and a drinking hole plug.

17. The collapsible container of claim 13, wherein the securing knob is substantially mushroom shaped.

18. The collapsible container of claim 1, wherein the upper and lower articulating walls have a height that is less than the height of either the at least one minor stage, the lower stage and the upper stage.

19. A collapsible container comprising of:
a frustoconical member with an upper articulated stage member, a lower articulated stage member, at least one minor stage, a lower stage, and an upper stage;
a sealing ridge connected to a first end of the upper stage;
a collar removably and slidably connected to the frustoconical member that is capable of insulating thermal energy; and
a lid slidably connected to the collar that is capable of insulating thermal energy; wherein
the upper articulated stage member, the lower articulated stage member, the at least one minor stage, the lower stage, and the upper stage all share a substantially concentric relation;
the upper stage is relatively closer to the sealing ridge than the minor stage and the minor stage is relatively closer to the sealing ridge than the lower stage;
the upper stage, the at least one minor stage, and the lower stage each have a thickness greater than that of the upper articulated stage member and the lower articulated stage member; and
the at least one minor stage is connected to the lower stage by the lower articulating stage member and is connected to a second end opposite the first end of the upper stage by the upper articulated stage member wherein
when an adequately strong downward force is exerted on the top of the frustoconical member and an equal and opposite force is exerted on the bottom of the frustoconical member, the upper articulated stage member transitions to a position such that the upper articulated stage member is positioned in-between and in direct contact with an inner surface of the at least one minor stage and an inner surface of the upper stage and
the lower articulated stage member transitions to a position such that the lower articulated stage member is positioned in-between and in direct contact with the outer surface of the at least one minor stage and an outer surface of the lower stage; and
wherein the sealing ridge causes a seal between the collar and the lid due to compression when the collar and the lid are connected.

20. A collapsible container comprising of:
a frustoconical member with an upper articulated stage member, a lower articulated stage member, at least one minor stage, a lower stage, and an upper stage;
a sealing ridge connected to a first end of the upper stage;
a collar removably and slidably connected to the frustoconical member that is capable of insulating thermal energy; and
a lid slidably connected to the collar that is capable of insulating thermal energy; wherein
the upper articulated stage member, the lower articulated stage member, the at least one minor stage, the lower stage, and the upper stage all share a substantially concentric relation;
the upper stage is relatively closer to the sealing ridge than the minor stage and the minor stage is relatively closer to the sealing ridge than the lower stage;
the upper stage, the at least one minor stage, and the lower stage each have a thickness greater than that of the upper articulated stage member and the lower articulated stage member; and
the at least one minor stage is connected to the lower stage by the lower articulating stage member and is connected to a second end opposite the first end of the upper stage by the upper articulated stage member wherein
when an adequately strong downward force is exerted on the top of the frustoconical member and an equal and opposite force is exerted on the bottom of the frustoconical member, the upper articulated stage member transitions to a position such that the upper articulated stage member is positioned in-between and in direct contact with an inner surface of the at least one minor stage and an inner surface of the upper stage and
the lower articulated stage member transitions to a position such that the lower articulated stage member is positioned in-between and in direct contact with the outer surface of the at least one minor stage and an outer surface of the lower stage; and
wherein the upper stage has a height greater than each of the at least one minor stages and the lower stage has a height greater than each of the at least one minor stages.

* * * * *